Nov. 25, 1969  HIDEO TATIBANA  3,480,129
APPARATUS FOR ARRANGING AMPULES AND FEEDING
THEM ONTO A CONVEYOR
Filed Jan. 22, 1968  4 Sheets-Sheet 1

INVENTOR
Hideo Tatibana
BY
ATTORNEY

United States Patent Office 3,480,129
Patented Nov. 25, 1969

3,480,129
APPARATUS FOR ARRANGING AMPULES AND
FEEDING THEM ONTO A CONVEYOR
Hideo Tatibana, 3–5 Nakano 6-chome,
Nakano-ku, Tokyo, Japan
Filed Jan. 22, 1968, Ser. No. 699,501
Claims priority, application Japan, Feb. 15, 1967,
42/9,324
Int. Cl. B65g 47/26, 3/00
U.S. Cl. 198—32                                5 Claims

ABSTRACT OF THE DISCLOSURE

The specification and drawings disclose an apparatus for arranging ampules fed to the apparatus into a row thereof and for feeding them onto a conveyor one-by-one. The apparatus comprises an inclined table on which a pair of downwardly converging belt conveyors are provided to form a planar funnel. A rotary disc is provided, which is rotatable around an axis which is perpendicular to the surface of the table, so as to partially intervene in the gap at the bottom ends of the funnel shaped belt conveyors. The ampules fed and stacked in the funnel with their axes directed perpendicularly to the table are taken out of the funnel through a gap provided between the rotary disc and the bottom end of one of the belt conveyors, as the rotary disc rotates. An arcuate guide wall parallel with the periphery of the disc and the periphery at the exit define a passage for the ampules which extends from the gap to terminate at above a third horizontal conveyor on which the ampules are fed one after one.

---

Figure 1:
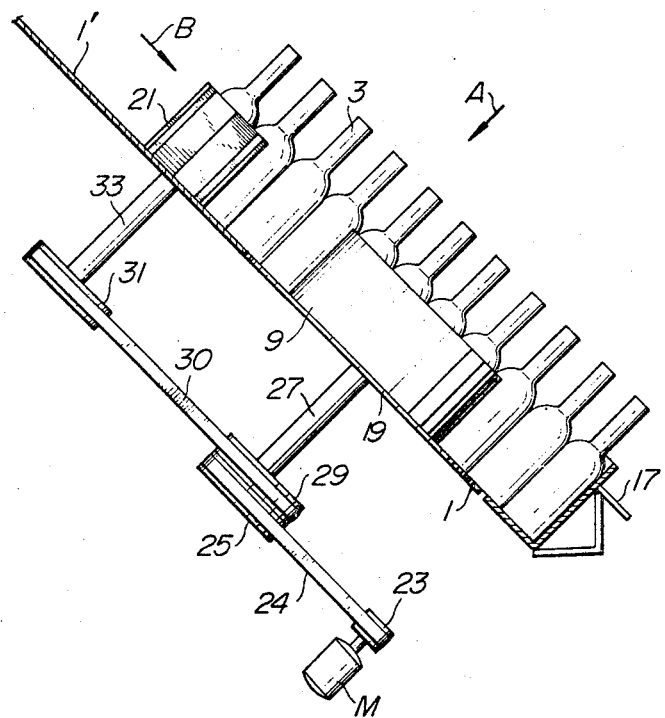

The present invention relates to an apparatus for arranging a number of ampules in regular order, and particularly to an apparatus adapted to arrange a number of ampules which are successively fed on a table into a row and to feed them onto a moving conveyor system.

More specifically, this invention relates to an apparatus for arranging on the conveyor system in a row a number of ampules, which has been, for instance, washed, sterilized, and supplied on an inclined table for the purpose of feeding the ampules to a succeeding processing station such as filling station where the ampules are to be filled with a liquid medicine.

When an ampule is washed and heated for the purpose of sterilization, large coefficient of friction is imposed on the outer surface of the ampule. When a number of such ampules are closely set upright on the inclined table, they cannot be advanced smoothly on the table. In accordance with this invention, even such ampules can be readily advanced on the table toward the conveyor system.

According to the present invention, there is provided an apparatus for arranging a number of ampules in regular order, comprising in combination a table 1 fixed obliquely, a pair of guide conveyors 7, 7' secured on said table 1 which are converged toward the downstream direction, a disc 9, 9', 9'' rotatable about an axis vertical to the surface of said table, said disc being positioned adjacent the lower end of one of said conveyors and spaced apart from the lower end of the other conveyor with a spacing therebetween of such an amount as could allow one ampule to pass away between said disc and the second named conveyor, a guide wall 11 positioned parallel with and apart from the periphery of said disc which cooperates with said disc to define a guide channel 15 connected with said spacing, said channel having a substantially equal width to that of said spacing, and a conveyor 17 positioned adjacent the discharge end of said guide channel.

The present invention also provides said apparatus in which a number of shallow grooves 10 are formed in parallel to the axis of said disc 9' at equal intervals around all the periphery thereof.

The present invention further provides said apparatus in which an annular flange 19 is secured to the lower end of said disc 9, 9', 9'', the upper surface of said flange being positioned at the level flush with or slightly lower than the upper surface of said table 1.

The present invention still further provides said apparatus in which a projection 21 having a polygonal section is rotatably mounted on said table 1 upstream of said disc.

Furthermore, the present invention provides said apparatus in which a number of deep grooves 10' are formed in parallel to the axis of said disc 9'' at equal intervals about all the periphery thereof.

Figure 2:
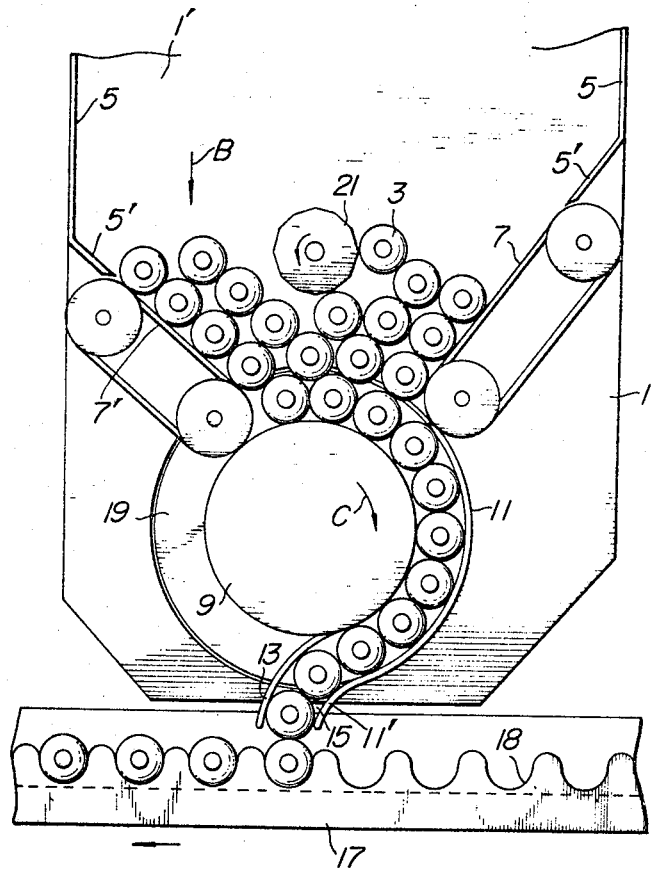
Figure 3:
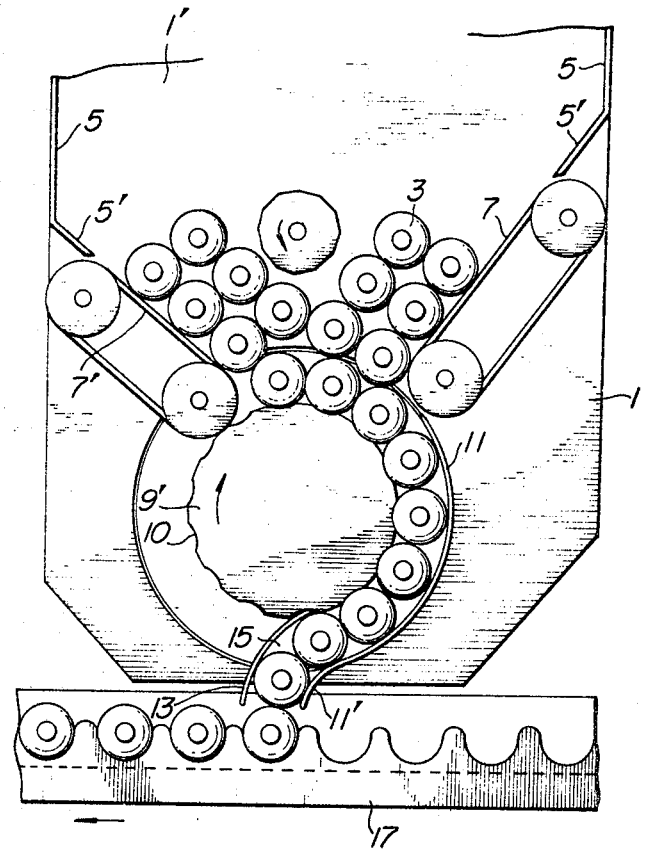
Figure 4:
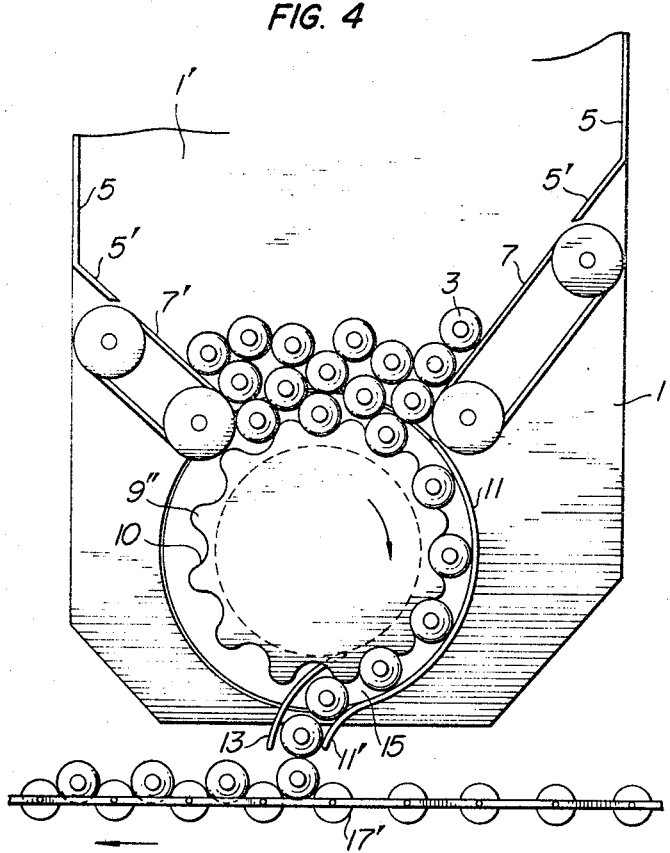

The present invention will be made more apparent from the following description made with reference to the accompanying drawings which show some preferred embodiments of the invention and in which:

FIG. 1 is a vertical cross sectional side view shown somewhat schematically through a longitudinal central axis of an embodiment of the present apparatus, FIG. 2 is a perspective top view as seen from the direction of an arrow A of the embodiment shown in FIG. 1, FIG. 3 is a view similar to that of FIG. 2, but showing a modified type of this apparatus, and FIG. 4 is a view similar to those of FIGS. 2 and 3, but showing another modified type of this apparatus.

In FIGS. 1 and 2, a reference numeral 1 is a table fixed obliquely, and a number of ampules 3 are successively and closely set upright at random places on the table 1 to be directed to the direction of an arrow B. Side walls 5 are provided on the upstream portion 1' of the table 1 lest the ampules should drop down from the sides of the table 1. The downstream ends 5' of the side walls 5 are converged to guide the ampules inwardly to the direction of the central portion of the table, and the ends 5' are closely followed by a pair of conveyors 7, 7' having runs converged inwardly. Upward and downward movements of the runs may serve to control the converging downward flow of the ampules.

As clearly shown in FIG. 2, a rotatable disc 9 is positioned closely adjacent the lower end of the conveyor 7', while it is spaced apart from the lower end of the conveyor 7 at a little larger interval than the diameter of the ampule 3. The disc 9 may be rotated as shown by an arrow C in FIG. 2. The disc 9 is of substantially the same height as the walls 5, 5' or conveyors 7, 7'.

In FIG. 2, a guide wall 11 is positioned apart from the periphery of the disc 9 at the right side thereof, and the lower end 11' of the guide wall 11 is smoothly curved back downwardly, and cooperates with further guide wall 13 to form a channel 15 for guiding the advancing ampules.

A conveyor 17 moves from right to left adjacent the downstream end of the guide channel 15, and is provided with a number of grooves 18 for receiving the ampules in a line.

As shown in FIG. 2, an annular flange 19 adapted to rotate integrally with the disc 9 is secured to the lower end of the disc 9. The present invention can be made further effective by such a construction that the feed of ampules is promoted by means of friction between the upper surface of the flange 19 and the bottom surface of ampules 3. Of course, the lower pulley of the left-hand conveyor 7' has to be supported on an arm extending upwardly from the table 1. It is preferable that the upper surface of the flange 19 is positioned at the level flush with or slightly lower than the surface of the table 1. The driving mechanism of the conveyors 7, 7' will need no explanation because the conventional driving mechanism may be utilized.

A projection 21 having a polygonal section is mounted on said table 1 upstream to some extent from said disc 9 so as to rotate clockwise and/or anticlockwise, whereby the choke or accumulation of the ampules in the area between the disc 9 and conveyors 7, 7' can be positively avoided.

In FIG. 1, the reference symbol M is an electric motor for driving the disc 9 and the projection 21. The disc 9 can be rotated through pulley 23, belt 24, pulley 25, and shaft 27. The projection 21 can be rotated through pulley 29 fixed to the shaft 27, belt 30, pulley 31, and shaft 33.

In the foregoing embodiment as shown in FIGS. 1 and 2, it will be easily understood that as the ampules 3 are not driven forcefully by the disc 9, and the relative motion between them is attended with slip, the disc 9 does not necessarily rotate at the same phase with that of running movement of the conveyor 17, and therefore the running speed of the conveyor 17 may be increased or changed in accordance with the flow speed of the ampules which are being discharged from the guide channel 15. The ampules 3 may be supplied on the upstream portion 1' of the table 1 by any means. The direction and speed of the movements of two conveyors 7, 7' may be suitably selected in accordance with the nature of the ampules, for instance, size, shape etc., so that the ampules can readily enter in a row into a passage between the disc 9 and the guide wall 11, and then can be received one by one in the grooves 18 formed on the conveyor 17 being advanced.

The embodiment of FIG. 3 is generally similar to that of FIGS. 1 and 2 except that the FIG. 3 arrangement contains a modified disc 9' having a number of shallow grooves 10 formed at equal intervals about all the periphery of the disc 9'. In the embodiment of FIG. 3, the ampules are half forcefully driven by the disc 9' to be brought away downward without slip, whereby the accumulation of the ampules in the area between the disc 9' and conveyors 7, 7' can be further positively avoided. In this case, it should be noted that even if the ampules should stagnate in the outlet of the guide channel 15 owing to the disparity in phases between the rotation of the disc 9' and the running movement of the conveyor 17, there would not be any risk that the ampules should be crushed because the grooves 10 are shallow. It is preferably, however, that the disc 9' would rotate at the same phase with that of running movement of the conveyor 17.

In the further embodiment of FIG. 4, a further modified disc 9" includes a number of grooves 10' deeper than grooves 10 in the embodiment of FIG. 3, which are also formed at equal intervals about the periphery of the disc 9". The ampules 3 can be entrapped in the deep grooves 10' in the course of their peripheral movement about the disc 9", and therefore the ampules will be forcefully transferred downward by the cooperation of the deep grooves 10' and the guide wall 11. In this embodiment, it is essential of course that the disc 9" should rotate at just the same phase with that of running movement of the conveyor 17'. Conventional mechanism may be used to cause the disc 9" and the conveyor 17' to move relative to each other at the same phase, and such mechanism will need no explanation.

The embodiment of FIG. 4 will be preferably utilized in case the vibration of the ampules would be extremely undesirable, for instance when the ampules are filled with refrigerated and dried pulverized medicine or other powders. In the embodiment of FIG. 3, when the disc 9' rotates at faster phase than that of running movement of the conveyor 17, the disc 9' will be obliged to skid while the ampules within the guide channel 15 will go in and out of the grooves 10, thereby to shake in the vicinity of their positions. In the embodiment of FIG. 4, as the ampules can be silently and smoothly transferred without vibration, it will not happen that the pulverized powder within the ampules will spring up and then will stick on the upper wall thereof.

While the resent invention has been described in connection with a few particular embodiments, it is to be understood that it is easily capable to obtain further various modifications and improvements. Changes, therefore, in the construction and arrangement may be made without departing from the spirit and scope of the invention as disclosed in the appended claims.

What is claimed is:
1. An apparatus for arranging a number of ampules in regular order, comprising in combination a table (1) fixed obliquely, a pair of guide conveyors (7), (7') secured on said table (1) which are converged toward the downstream direction, a disc (9, 9', 9") rotatable about an axis vertical to the surface of said table, said disc being positioned adjacent the lower end of one of said conveyors and spaced apart from the lower end of the other conveyor with a spacing therebetween of such an amount as could allow one ampule to pass away between said disc and the second named conveyor, a guide wall (11) positioned parallel with and apart from the periphery of said disc which cooperates with said disc to define a guide channel (15) connected with said spacing, said channel having substantially equal width to that of said spacing, and a conveyor (17) positioned adjacent the discharge end of said guide channel.

2. The apparatus according to claim 1, in which a number of shallow grooves (10) are formed in parallel to the axis of said disc (9') at equal intervals around all the periphery thereof.

3. The apparatus according to claim 1, in which an annular flange (19) is secured to the lower end of said disc (9, 9', 9"), the upper surface of said flange being positioned at the level flush with or slightly lower than the upper surface of said table (1).

4. The apparatus according to claim 1, in which a projection (21) having a polygonal section is rotatably mounted on said table (1) upstream of said disc (9, 9', 9").

5. The apparatus according to claim 1, in which a number of deep grooves (10') are formed in parallel to the axis of said disc (9") at equal intervals about all the periphery thereof.

References Cited
UNITED STATES PATENTS
| | | | |
|---|---|---|---|
| 2,346,610 | 4/1944 | Rose | 198—30 |
| 2,924,356 | 2/1960 | Pollman et al. | 221—175 |
| 3,189,178 | 6/1965 | Calleson et al. | 302—2 |

ANDRES H. NIELSEN, Primary Examiner

U.S. Cl. X.R.

302—2